United States Patent
Halpern

[15] 3,667,472
[45] June 6, 1972

[54] ADHESIVE FOR LIVING TISSUE
[72] Inventor: Benjamin D. Halpern, Jenkintown, Pa.
[73] Assignee: Borden, Inc.
[22] Filed: Oct. 19, 1961
[21] Appl. No.: 155,741

[52] U.S. Cl. .................................. 128/334 R, 260/78.4 N
[51] Int. Cl. ....................................................... A61b 17/04
[58] Field of Search ............... 260/45.5 AF, 45.5 AK, 78.4 N, 260/881; 128/334–335, 155–156, 90

[56] References Cited

UNITED STATES PATENTS

| | | | |
|---|---|---|---|
| 3,223,083 | 12/1965 | Cobey | 128/92 |
| 2,784,127 | 3/1957 | Joyner et al. | 128/334 UX |
| 2,624,690 | 1/1953 | Leader et al. | 128/156 X |
| 2,765,332 | 10/1956 | Coover et al. | 260/45.5 AF X |
| 2,794,788 | 6/1957 | Coover et al. | 260/45.5 AF X |
| 2,804,073 | 8/1957 | Gallienne et al. | 128/156 |
| 2,816,093 | 12/1957 | Coover | 260/45.5 AF X |
| 2,972,545 | 2/1961 | Briskin | 128/156 |

OTHER PUBLICATIONS

Journal of Laboratory and Clinical Medicine, Kodak Advertisement Nov. 1957 Vol. 50 no. 5 page 23
Carton et al., " A Plastic Adhesive Method of Small Blood Vessel Surgery" from World Neurology, Vol. 1, 1960 pages 356–361
Nathan et al., " Nonsuture Closure of Arterial Incisions Using a Rapidly–Polymerizing Adhesive" from Annals of Surgery, Vol. 152 No. 4, Oct. 1960 pp. 648–659

*Primary Examiner*—Dalton L. Truluck
*Attorney*—George P. Maskas and Edward L. Mandell

[57] ABSTRACT

This invention relates to the surgical use of monomeric $C_2$–$C_4$ alkyl alpha-cyanoacrylate adhesives for the purpose of rapidly bonding together moist living tissue. The said adhesives are applied to the tissue wherein polymerization takes place in situ and the tissue is firmly bonded together.

5 Claims, No Drawings

ADHESIVE FOR LIVING TISSUE

This invention relates to an adhesive for moist living tissue.

When the adhesive is principally a lower alkyl alpha-cyanoacrylate, is sets quickly on contact with the human skin in spite of the acidic mantle over the skin, on the wall of a blood vessel or on other living tissue. When used to repair an incision, for example, the glue becomes a closure which remains in position until normal body restoration can occur. When a drop of the cyanoacrylate is pressed between the fingers for a few seconds, it sets to such a strong bond that the fingers can be separated only by slow and steady application of considerable force, thus showing the strength of the bond.

The present invention provides a modified form of the adhesive that can be applied in most effective thickness over living tissue without diffusing into the tissue in amount to cause irritation or necrosis of the tissue and spreading over objectionably large areas beyond the site to be adhered. It provides also an adhesive film that when set is satisfactorily flexible and adherent to the tissue without peeling or cracking.

Briefly stated the invention comprises the herein described product and process for bridging or closing surgical incisions, body lesions, aneurysms or the like and adhering patches over the living tissue, the film forming material being a composition including a lower alkyl alpha-cyanoacrylate in combination with a modifying agent serving as an antidiffusion and flexibilizing agent.

Our composition is self-sterilizing. It is activatable, i.e., caused to polymerize, by either water or alkali or free radicals. Setting in contact with even the moisture of the human skin begins ordinarily in about 10 seconds or less, although in practice the period of holding together of the tissues to be bonded or bridged may run to 2 – 5 minutes or longer after the adhesive is applied.

The modifying agent is also a moderate retarder of setting, retardation allowing more time for application of the adhesive without interfering with the ultimate strength of the film for the present purposes.

As the alpha-cyanoacrylate ester I use any $C_1$–$C_4$ alkyl ester, i.e., the methyl, ethyl, propyl, or butyl but ordinarily the methyl alpha-cyanaoacrylate.

As the antidiffusion or modifying agent I use a normally solid polymeric resin that is soluble in the proportions used in the alpha-cyanoacrylate ester at 30° C. or higher, compatible therewith and non-separating therefrom on cooling the resulting solution to 10° C., insoluble in water, and substantially non-toxic in the amounts and under the conditions of use. Examples of such agents are the homopolymers of $C_1$–$C_8$ alkyl and alkenyl esters of ethenoid bond polymerizable aliphatic acids such as the methyl, ethyl, butyl, hexyl, ethyl hexyl and allyl acrylates, methacrylates and alpha-cyanoacrylates; copolymers of any one of the said esters with another one; resinous polyesters of water soluble polyols such as ethylene glycol, propylene glycol, and glycerine with polybasic organic acids of which adipic, sebacic and phthalic acids are examples; and mixtures of such agents. These modifiers are of very high molecular weight. Their large molecules block the passages through semi-permeable membranes such as animal skins and vegetable membranes or otherwise restrict diffusion therethrough.

I obtain such results by using about 5 – 25 percent of the antidiffusion agent and preferably 5 – 15 percent of the weight of the selected alkyl alpha-cyanoacrylate.

The two materials in these proportions are readily mixed in any convenient manner as by stirring at room temperature or at moderately elevated temperature such as 30° – 100° C. to accelerate solution of the said agent in the cyanoacrylate. The said composition is kept in substantially anhydrous condition at all times up to the moment of application and suitably also in contact with about 0.006 percent of the monomethyl ether of hydroquinone as stabilizer.

The composition may be thinned or otherwise diluted, for use as an aerosol spray, by one of the Freons such as monofluoro trichloro, dichloro difluoro, or trifluoro monochloromethane, or like propellant boiling below about 15° C. at atmospheric pressure.

Nitrogen, carbon dioxide, butane or like inert gas may be incorporated as the propellant by usual technique and in usual equipment.

The proportions of the low boiling propellant, if any, can be varied over wide limits, as for example, from 5 to 50 times the weight of the alpha-cyanoacrylate.

As to conditions of use, the adhesive composition may be applied by spreading over the parts to be adhered, in any usual manner. Thus it may be applied as a ribbon squeezed through a slit orifice of a squeeze bottle, spread on with a glass rod or a sterile camel's hair brush, or sprayed on as an aerosol. When an incision is being bridged, for instance, the tissues are held together and maintained in fixed relationship until the adhesive has been applied as a band over the incision and allowed the necessary time, up to about 5 minutes, to develop a strong bond. The wound or incision then heals with the adhesive in position and without any serious difficulty from the presence of the adhesive. No suture is required. When a patch is to be applied, then the adhesive is first coated on either the patch or the body tissue, and the patch pressed into position and held firmly against the tissue for a time such as 1 – 5 minutes until the adherence is effected.

The patch may be any commonly used surgical textile, e.g., one of the textiles having a base of polyamide, polyester, polytetrafluoroethylene or polyacrylonitrile fibers.

The composition described herein is not to be used on the body under any circumstance except by a physician or surgeon.

The adhesive may be applied likewise to living vegetable tissue, as in joining broken stalks of plants or over the cuts made in a tree branch for grafting.

The invention is further illustrated by description in connection with the following specific examples of the practice of it, proportions here and elsewhere herein being expressed as parts by weight unless stated to the contrary.

EXAMPLE 1

An adhesive for use on animal tissue is made by mixing 15 parts of powdered poly(methyl methacrylate) in 100 parts of methyl alpha-cyanoacrylate. These materials as used are anhydrous and free from any contamination providing active anions, i.e., such hydroxide as that supplied by sodium hydroxide or alkoxide from an alcohol. The whole is warmed gradually and with stirring for a few minutes to the temperature at which the powder dissolves, as to a temperature varying, with the rate of solution desired, within the range 30° – 100° C. or more.

The composition is then ready for application either with or without the incorporation of a propellant liquid or gas.

The composition made as described is applied to guinea pigs as test animals as by the technique described earlier herein or as described and with the results shown by Drs. Nathan Nachlas, Solomon and Seligman and Halpern (the applicant) in Annals of Surgery 152, pp. 648 – 659, published Oct. 24, 1960.

EXAMPLE 2

The procedure and composition of Example 1 are used except that the poly(methyl methacrylate) is replaced by an equal weight of any of the other modifying agents disclosed herein and the monomethyl ether of hydroquinone is admixed, as stabilizer, in the proportion of 0.006 percent of the weight of the methyl alpha-cyanoacrylate.

EXAMPLE 3

The procedure and composition of Example 1 are used except that the methyl alpha-cyanoacrylate is replaced, separately and in turn, by an equal weight of the corresponding ethyl, isopropyl, butyl and hexyl alpha-cyanoacrylates.

The rates of setting with the ethyl and butyl esters, for example, are half or less and tenth, respectively, of the rate of the methyl ester.

To increase the setting rates for the esters higher than methyl, there may be incorporated a polymerization accelerator such as sodium methylate, a water soluble amine, or a free radical supplying catalyst. Examples of the latter are t-butyl hydroperoxide and benzoyl peroxide. The peroxides may be used in combination with an amine such as tributylamine. The amine may be painted separately on the surface to be adhered before the adhesive composition and peroxide are applied. The accelerator is used in conventional proportions for this type of catalyst.

EXAMPLE 4

The procedure and composition of Example 1 are used except that 5 percent of dioctyl phthalate, of the weight of the cyanoacrylate, is introduced as a plasticizer in advance of the warming step.

In a modification of this Example, other plasticizers are substituted, separately and in turn and in the 5 percent proportion, for the dioctyl phthalate, such other plasticizers being dibutyl sebacate and adipate, tricresyl phosphate and ethylene glycol dicyanoacetate.

It will be understood that it is intended to cover all changes and modifications of the examples of the invention herein chosen for the purpose of illustration which do not constitute departures from the spirit and scope of the invention.

I claim:

1. The process of adhering moist tissue which comprises applying thereto the adhesive composition comprising a monomeric $C_2$–$C_4$ alkyl alpha-cyanoacrylate and a normally solid polymeric resinous antidiffusion agent dissolved in the amount of 5 – 25 parts in 100 parts of said cyanoacrylate, said agent being selected from the group consisting of polymers and copolymers of $C_1$–$C_8$ alkyl and alkenyl esters of acrylic, methacrylic and alpha-cyanoacrylic acids and resinous polyesters of water soluble glycols and glycerine with polybasic organic acids, and maintaining said composition in film form on said tissue until the film sets to cured condition.

2. The process of adhering moist living tissue which comprises applying thereover an adhesive composition including 100 parts ethyl alpha-cyanoacrylate and 5 – 25 parts of poly (methyl-methacrylate) and maintaining said composition in film form on the moist tissue until the composition sets to cured condition.

3. The process of adhering moist tissue which comprises applying thereto the adhesive composition comprising a monomeric ethyl alpha-cyanoacrylate and a normally solid polymeric resinous anti-diffusion agent dissolved in the amount of 5 – 25 parts in 100 parts of said cyanoacrylate, said agent being selected from the group consisting of polymers and copolymers of $C_1$–$C_8$ alkyl and alkenyl esters of acrylic, methacrylic and alpha-cyanoacrylic acids and resinous polyesters of water soluble glycols and glycerine with polybasic organic acids, and maintaining said composition in film form on said tissue until the film sets to cured condition.

4. The process of adhering moist tissue which comprises applying thereto the adhesive composition comprising a monomeric propyl alpha-cyanoacrylate and a normally solid polymeric resinous anti-diffusion agent dissolved in the amount of 5 – 25 parts in 100 parts of said cyanoacrylate, said agent being selected from the group consisting of polymers and copolymers of $C_1$–$C_8$ alkyl and alkenyl esters of acrylic, methacrylic and alpha-cyanoacrylic acids and resinous polyesters of water soluble glycols and glycerine with polybasic organic acids, and maintaining said composition in film form on said tissue until the film sets to cured condition.

5. The process of adhering moist tissue which comprises applying thereto the adhesive composition comprising a monomeric butyl alpha-cyanoacrylate and a normally solid polymeric resinous anti-diffusion agent dissolved in the amount of 5 – 25 parts in 100 parts of said cyanoacrylate, said agent being selected from the group consisting of polymers and copolymers of $C_1$–$C_8$ alkyl and alkenyl esters of acrylic, methacrylic and alpha-cyanoacrylate acids and resinous polyesters of water soluble glycols and glycerine with polybasic organic acids, and maintaining said composition in film form on said tissue until the film sets to cured condition.

* * * * *